Aug. 14, 1928.

S. MELTON 1,681,004

POWER FACTOR CONTROL FOR POWER SYSTEMS

Filed Nov. 10, 1925  2 Sheets-Sheet 1

INVENTOR
Sherman Melton

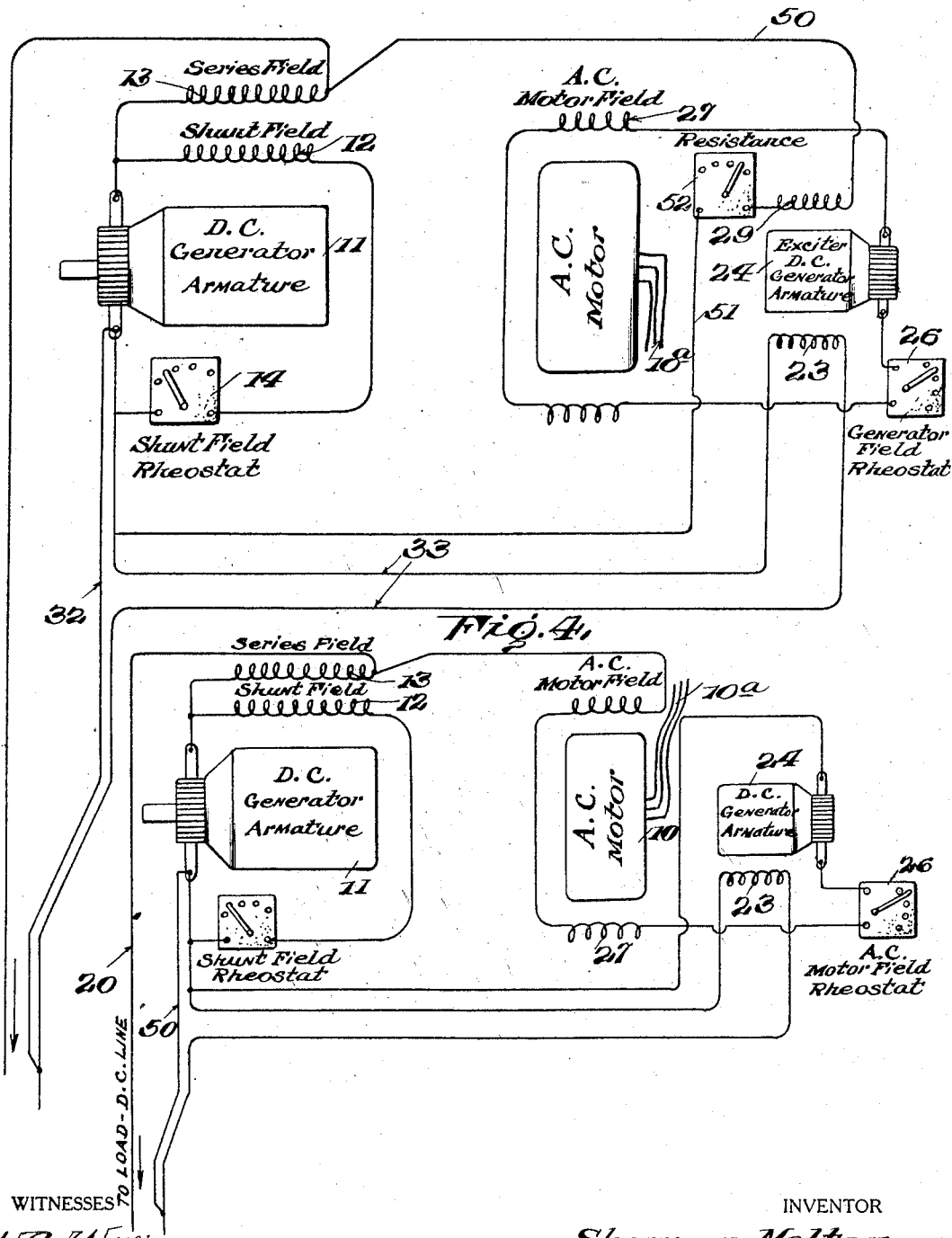

Patented Aug. 14, 1928.

1,681,004

UNITED STATES PATENT OFFICE.

SHERMAN MELTON, OF STURGIS, KENTUCKY.

POWER-FACTOR CONTROL FOR POWER SYSTEMS.

Application filed November 10, 1925. Serial No. 68,219.

This invention relates to means for controlling the power factor of alternating current power supply systems having a major synchronous motor load connected thereto.

As is well known in power transmission and distribution systems synchronous motors are commonly employed for driving direct current generators, the synchronous motors being connected to the alternating current power lines and the direct current generators supplying current for distribution. In systems of this kind the power factor of the alternating current power system will usually lead during light load periods and lag during heavy load periods. This condition is due to the synchronous motors and unless corrected results in low operative efficiency of the system.

The purpose of this invention is to provide means whereby the power factor of an alternating current power system having a synchronous motor load may be maintained at unity or 100%.

A further object of my invention is that the power factor controlling means be adapted to be employed as a voltage control for an alternating current generator when driven from a direct current motor.

Other objects will hereinafter appear.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figures 3 and 4 show further modified forms of the control system shown in Figures 1 and 2.

Figure 1:
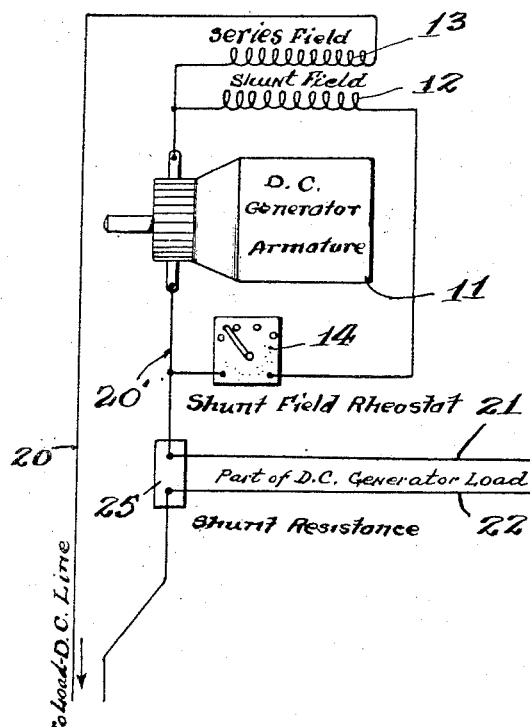
Figure 1 shows diagrammatically an electric control system for correcting the power factor of alternating current power system having a synchronous motor connected thereto and driving a direct current generator.
Figure 1:
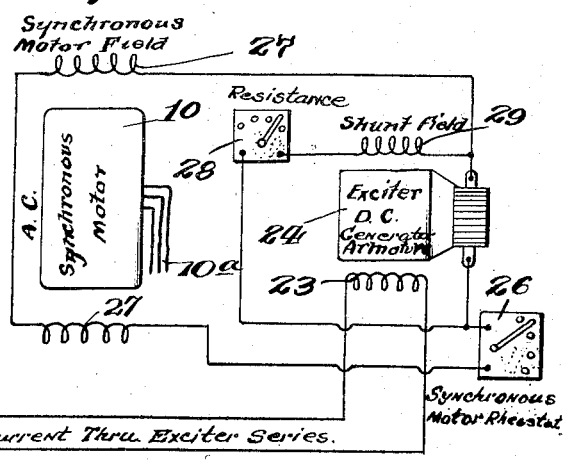

Referring more particularly to Figure 1, the reference numeral 10 indicates an alternating current synchronous motor which is connected to an alternating current power system, not shown. The synchronous motor 10 is adapted for driving a direct current generator of which 11 is the armature, 12 a shunt field, and 13 a series field, the shunt field being controlled by a rheostat 14 and connected about the armature 11. The numerals 20 and 20' indicate the load leads of armature 11. Wires 21 and 22 are extended from a separately excited field 23 of an exciter 24 for the synchronous motor 10, and said wires are connected about a shunt 25. The armature of exciter 24 is connected in series with the field coils 27 of the synchronous motor 10, and also interposed in this circuit is the usual synchronous motor field rheostat 26. The exciter 24 has a compound field and its shunt field 29 is connected about the armature as shown and has interposed therein an adjustable resistance 28.

Before proceeding with a general description of the operation of system shown in Figure 1 and heretofore described, I will point out how the operation of a synchronous motor influences the power factor of the alternating current power system to which the same is connected.

As is well understood a synchronous motor operating from an alternating current supply circuit or system will give or cause a power factor of 100% for the supply circuit or system as long as the counter electromotive force or voltage built up by the synchronous motor is of approximately equal value to the impressed electromotive force or voltage of the supply system. If the field strength of the synchronous motor remains the same and more load is applied thereto the counter electromotive force of the synchronous motor is lowered which causes a lagging power factor in a manner well understood by those skilled in the art. When the load upon the synchronous motor becomes light the power factor of the alternating current supply system tends to lead.

The operation of my system as shown in Fig. 1 is as follows:

As the load increases on the direct current generator driven by the alternating current synchronous motor 10, the amount of current flowing through the field coil 23 of exciter 24 will proportionately increase which will cause the voltage of the exciter to increase and likewise the current flow through the synchronous motor field coils and thereby increase the counter electromotive force of the synchronous motor which tends to stabilize the power factor which would have been caused otherwise to lag as the load increased on the alternating current synchronous motor. The resistances 26 and 28 can be adjusted to produce the desired power factor during light load and with the system shown this power factor will be maintained over a wide variation of load upon the synchronous motor 10. If the alternating current power system had a number of synchronous motors connected therewith and the same were equipped with a power factor balancing system of my invention then the power factor of the supply system would remain stable in spite of other influences tending to vary the same.

It is well known that when a lagging power factor is present on a circuit, especially at the end of a branch line, the voltages of the supply circuit and consuming apparatus connected thereto is a compromise to a low voltage, while with a leading power factor resulting from a higher counter electromotive force on the synchronous motor, than that of the line from which the power is drawn, the resultant voltage at the motor generator set or its switchboard is high; consequently a variation in voltage resulting at the end of a line which is of ample capacity to supply the load probably as much as 25%, while by maintaining a power factor of 100%, the voltage variation may not be above 5%. By use of the construction defined herein, the power factor may be modified to a leading value on heavier loads on the synchronous motor, so as to compensate for any voltage loss which might otherwise result on the line with a power factor of unity, and a synchronous motor when driving a direct current load may be caused to maintain a practically constant voltage on the circuit supplying the motor generator.

It has been shown by experiment that with the application as above described a power factor of practically 100% may be maintained on a motor generator set from no load to 100% overload, whereas in common practice the power factor might run from 40% leading on no load, to a 40% lagging power factor on 25 to 50% overload, and in common practice where a motor generator set runs most of the time on as low as 30% normal load with a leading power factor at this load of say 90%, then if a high overload is applied to the machine, the power factor may lag to approximately a zero value, and cause what is known electrically as a slip from synchronism; or in other words the synchronous motor lags out of synchronism with the generator driving the motor. It should be easily seen, therefore, that the idea of power factor correction by the above means is very desirable on synchronous motor generator sets with a variable and fluctuating load.

Figure 2:
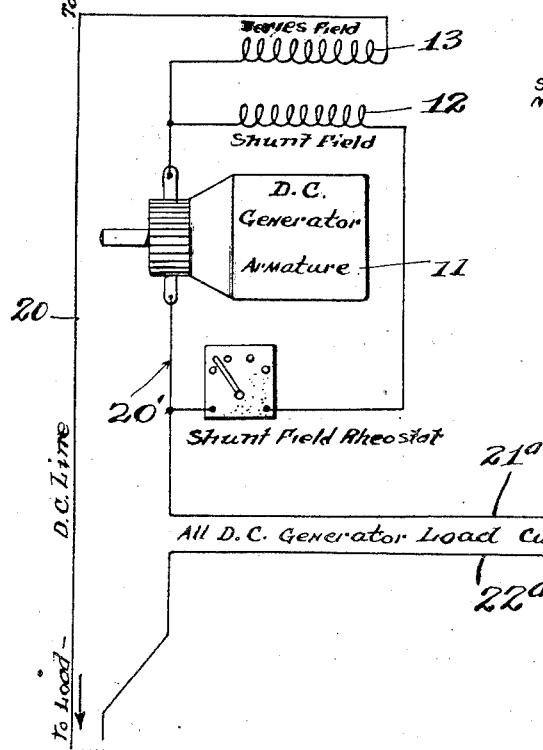
Figure 2 shows a modified form of the same system.
Figure 2:
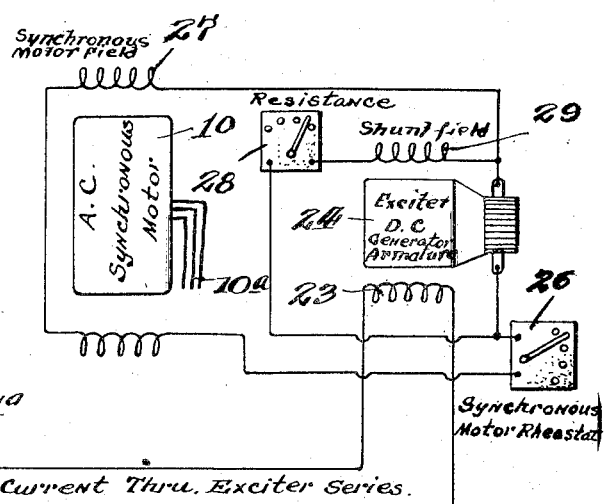

The control system shown in Figure 2 is similiar in all respect to that shown in Figure 1 with the omission of the shunt resistance 25 so that the separately excited field of the exciter 24 is connected in series with armature 11 by wires 21$^a$ and 22$^a$. In such a case the field of the exciter is made more powerful than in the case shown in Figure 1 and thus making a more positive control system.

Referring to Figure 3 the system shown is similar to the system shown in Figures 1 and 2, except that in Figure 3 the field 29 of the exciter 24 is connected through leads 50 and 51 about the armature and series field of the driven generator instead of about the armature of the exciter as in Figures 1 and 2. It may here be pointed out that field coil 23 of exciter 24 may be employed with or without the load lead 32 in this arrangement.

Referring to Figure 4 the system shown is similar to the systems shown in Figure 3 viz, in so far as pertaining to the regulation of the power factor of an alternating current supply system with a motor generator set connected thereto. It will be noted in the system shown in Figure 4, the shunt field of exciter for synchronous motor 10 is omitted, and that field of said motor is connected in series with exciter armature 24, rheostat 26, and armature of the direct current generator driven by the synchronous motor. The field 23 of the exciter is shunted about the load lead 50. It may be here noted that the exciter field 23 may be connected in series with armature 11 of the generator in the system shown if so desired. The system shown in Figure 4 operates for correcting the power factor of the alternating current supply system in a similar manner when considered in connection with the description of the operation of the systems shown in Figures 1 and 2.

In summarizing all previous statements in connection with power factor control and voltage regulation, by employment of the ideas employed in this invention, all of which may be said to be the compounding of an alternating current motor or generator field, to affect power factor correction or voltage regulation as the case may be, the application of this invention is not confined to any particular number of motors and generators connected to the same shaft, or driven otherwise. When machines neighbor each other sufficiently close to enable connections to be made economically, then the scheme may be employed to serve various numbers of generators and motors connected to the same shaft, and excited from one or more sources of supply; that is to say, several driving motors whose fields are excited from one or more sources of supply may be controlled. Also, if one motor is driving more than one generator, either through shaft or other means of drive, and each generator has an individual load or circuit to supply, then the power factor of the driving motor can be controlled by employing one or more series coils on the exciting generator field.

What I claim is:

1. A synchronous motor and direct current generator set, said motor being adapted for driving the generator, a direct current exciter for said motor, and a connection between the output leads of the generator and field of said exciter.

2. A synchronous motor and direct current generator set, said motor being adapted for driving the generator, a direct current exciter for said motor, and a shunt connection between the output leads of the generator and field coil of the exciter.

3. A synchronous motor and direct current generator set, said motor being adapted for driving the generator, a direct current exciter for said motor, a compound field winding for said exciter, and supply connections between one field coil of the exciter and armature of the generator whereby current through said field winding will vary with load upon the generator.

4. A synchronous motor and direct current generator set, said motor being adapted for driving the generator, a direct current exciter for said motor, a compound field winding for said exciter, and current supply connections between one field coil of the exciter and said generator whereby the voltage of the exciter will be controlled by the load imposed upon said generator.

5. A synchronous motor and D. C. generator set, said motor being adapted for driving the generator, a D. C. current compound wound exciter for said motor, a connection between one of the exciter field coils and one of the generator leads taking current from said lead in proportion to the D. C. generator load, the other exciter field coil being connected in parallel with the main generator armature circuit.

6. A synchronous motor and D. C. current generator set, said motor being adapted for driving the generator, a D. C. current compound wound exciter for said motor, a connection whereby one field coil of the exciter is energized by load current of the generator, and means whereby a substantially constant E. M. F. is impressed on the other field coil.

7. A synchronous A. C. motor D. C. generator set having a compound wound D. C. exciter, means for energizing one of the field coils of the exciter with substantially constant potential electrical energy, and means for energizing the other field coil of the exciter proportionately to the output of the generator.

SHERMAN MELTON.